United States Patent
van Eyndhoven et al.

(10) Patent No.: US 10,214,185 B2
(45) Date of Patent: Feb. 26, 2019

(54) QUICK CONNECTING DEVICE FOR FIN RAY WIPER

(71) Applicant: Robert Bosch GmbH, Stuttgart (DE)

(72) Inventors: Adriaan van Eyndhoven, Stuttgart (DE); Michael Weiler, Buehl (DE); Peter Deak, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 15/328,487

(22) PCT Filed: Jul. 10, 2015

(86) PCT No.: PCT/EP2015/065817
§ 371 (c)(1),
(2) Date: Jan. 24, 2017

(87) PCT Pub. No.: WO2016/012272
PCT Pub. Date: Jan. 28, 2016

(65) Prior Publication Data
US 2017/0217407 A1 Aug. 3, 2017

(30) Foreign Application Priority Data
Jul. 24, 2014 (DE) .................. 10 2014 214 571

(51) Int. Cl.
*B60S 1/34* (2006.01)
*B60S 1/38* (2006.01)

(52) U.S. Cl.
CPC .......... *B60S 1/3801* (2013.01); *B60S 1/3427* (2013.01); *B60S 1/3436* (2013.01); *B60S 1/3459* (2013.01);
(Continued)

(58) Field of Classification Search
CPC .......... B60S 1/342; B60S 1/34; B60S 1/3443; B60S 1/3459; B60S 1/3461; B60S 1/3436;
(Continued)

(56) References Cited

U.S. PATENT DOCUMENTS 1,662,244 A * 3/1928 Folberth et al. ...... B60S 1/3427
15/250.34
1,986,962 A * 1/1935 Evans ................... B60S 1/34
15/250.34
(Continued)

FOREIGN PATENT DOCUMENTS

| CN | 101351365 A | 1/2009 |
| CN | 202225839 U | 5/2012 |

(Continued)

OTHER PUBLICATIONS

Machine translation of description portion of German publication 102012201287, published Aug. 2013.*
(Continued)

*Primary Examiner* — Gary K. Graham
(74) *Attorney, Agent, or Firm* — Michael Best & Friedrich LLP

(57) ABSTRACT

The invention relates to a windshield wiper device (100) for a vehicle, comprising a wiper blade (2) having an elongated upper part (10) and an elongated lower part (12), which are configured to be flexible, at least in part. Also provided are multiple connecting elements (18) for connecting the upper part (10) and the lower part (12), the connecting elements being mutually spaced along a longitudinal extent (8) of the wiper blade (2) and being attached to the upper part (10) and/or the lower part (12) by a rotary joint, and the connecting elements (18) being designed to allow a movement of the upper part (10) and the lower part relative to each another with a movement component along a longitudinal (Continued)

extent (8) of the wiper blade (2). Said windshield wiper device further comprises a quick-connecting device (32) which is designed such that the windshield wiper device can be detachably connected to a drive shaft (35) of a drive unit of the vehicle. At least one engagement part (36) and an elastic clamping jaw (38) cooperate in order to switch when applying an external force between a clamping position (K) and a release position (F).

19 Claims, 4 Drawing Sheets

(52) U.S. Cl.
CPC ..... *B60S 1/3484* (2013.01); *B60S 2001/3812* (2013.01); *B60S 2001/3825* (2013.01)

(58) Field of Classification Search
CPC ........ B60S 1/3438; B60S 1/38; B60S 1/3801; B60S 1/3427; B60S 2001/3825; B60S 2001/3812; Y10T 403/59; Y10T 403/591; Y10T 403/593; Y10T 403/595; Y10T 403/60
USPC .............. 15/250.351, 250.352, 250.34; 403/DIG. 4, 230, 257, 256, 321, 322.1, 403/322.3, 325, 226
See application file for complete search history.

(56) References Cited

U.S. PATENT DOCUMENTS

| | | | |
|---|---|---|---|
| 3,048,430 A * | 8/1962 | Reese | B60S 1/34 403/321 |
| 3,433,513 A | 3/1969 | Hambly et al. | |
| 4,901,402 A | 2/1990 | Begemann | |
| 5,755,005 A * | 5/1998 | Turbessi | B60S 1/34 15/250.34 |

FOREIGN PATENT DOCUMENTS

| | | | |
|---|---|---|---|
| DE | 1045826 | | 12/1958 |
| DE | 102005046325 | * | 5/2007 |
| DE | 102005060865 | | 6/2007 |
| DE | 102012201287 | | 8/2013 |
| DE | 102013214064 | | 5/2014 |
| EP | 2335879 A1 | | 6/2011 |
| FR | 2109782 | | 5/1972 |
| WO | 2008040373 A1 | | 4/2008 |
| WO | 2015071085 | | 5/2015 |

OTHER PUBLICATIONS

International Search Report for Application No. PCT/EP2015/065817 dated Oct. 14, 2015 (English Translation, 3 pages).

* cited by examiner

QUICK CONNECTING DEVICE FOR FIN RAY WIPER

BACKGROUND OF THE INVENTION

The invention relates to a windshield wiper device for a vehicle, in particular a motor vehicle.

Windshield wiper devices typically have a wiper arm or wiper lever, wherein a wiper blade is moved over the windshield of a motor vehicle. The wiper blade is moved here between a first turning position and a second turning position. For this purpose, the wiper arm is connected via the drive shaft to a wiper motor. In particular on windshields having pronounced changes in curvature, the wiper blade easily loses contact with the windshield. This may result in wiping areas not being wiped or in smearing, in the case of windshields having a pronounced curvature.

Since a wiping operation has to be optimized for a multiplicity of parameters, such as, for example, the amount of rain falling on the windshield, a possible snow loading on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

A plurality of boundary conditions should additionally be taken into consideration for improvement purposes. There is also a need here to ensure or improve the handling or the user friendliness, for example in the installation or the removal of the wiper arm.

SUMMARY OF THE INVENTION

It is the object of the present invention to ensure a reliable and substantially smear-free wiping of a windshield of a vehicle, wherein a contact pressure of the wiper blade against the windshield is kept as constant as possible, and the wiper arm of the windshield wiper device can be installed or can be removed in a simple manner.

According to an embodiment of the present invention, a windshield wiper device for a vehicle, in particular a motor vehicle, is proposed. The windshield wiper device comprises a wiper arm with a wiper blade comprising an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade and are attached to the upper part and/or to the lower part by means of a rotary joint. The connecting elements are designed in order to permit a movement of the upper part and of the lower part relative to each other with a movement component along a longitudinal extent of the wiper blade.

The windshield wiper device has a quick connecting device which is designed in order to connect the wiper arm of the windshield wiper device releasably to a drive shaft of a windshield wiper drive unit (wiper motor) of the vehicle. The quick connecting device has an engagement part which is designed in order to engage in the drive shaft and/or in a torque transmission part attached to the drive shaft, in order to transfer a torque from the drive shaft to the wiper arm via the quick connecting device, and an elastic clamping jaw which is designed in order to transfer the engagement part, when an external force is applied, from a clamping position, in which the quick connecting device clamps the wiper arm to the drive shaft, into a release position, in which the wiper arm of the windshield wiper device is removable from the drive shaft.

Preferred embodiments and particular aspects of the invention emerge from the dependent claims, the drawings and the present description.

According to the embodiments of the invention that are described here, windshield wiper devices for vehicles can be produced in a particularly favorable manner and for a plurality of different fields of use. Furthermore, the embodiments of the invention permit a reliable and substantially smear-free wiping of a windshield of a vehicle, wherein a wiper arm of the windshield wiper device can be installed or removed in a simple manner and within a short time.

According to an embodiment of the present invention, a windshield wiper device for a vehicle, in particular a motor vehicle, is proposed. The windshield wiper device comprises a wiper arm with a wiper blade comprising an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade and are attached to the upper part and/or to the lower part by means of a rotary joint. The connecting elements are designed in order to permit a movement of the upper part and of the lower part relative to each other with a movement component along a longitudinal extent of the wiper blade. The windshield wiper device has a quick connecting device which is designed in order to connect the wiper arm of the windshield wiper device releasably to a drive shaft of a drive unit of the vehicle. The quick connecting device has an engagement part which is designed in order to engage in the drive shaft and/or in a torque transmission part attached to the drive shaft, in order to transfer a torque from the drive shaft to the wiper arm via the quick connecting device, and an elastic clamping jaw which is designed in order to transfer the engagement part, when an external force is applied, from a clamping position, in which the quick connecting device clamps the wiper arm to the drive shaft, into a release position, in which the wiper arm of the windshield wiper device is removable from the drive shaft.

According to yet further embodiments, the quick connecting device has a fastening part which is designed in order to connect the upper part and the lower part of the wiper blade to the quick connecting device. This ensures simple handling of the entire wiper arm with wiper blade and wiper blade head during removal or during installation of the wiper arm.

According to yet further embodiments, the quick connecting device can contain a material which is selected from the group which consists of rubber, carbon, POM, PA, TPE, in particular TPE-S, TPE-O, TPE-U, TPE-A, TPE-V and TPE-E, or any combination thereof.

This affords the advantage that, by means of a suitable selection of material, physical and in particular mechanical properties of the windshield wiper device integrally with the quick connecting device can be set. Furthermore it is possible for the quick connecting device to be formed together with the wiper arm as an integral component by injection molding, as a result of which advantages in terms of manufacturing are obtained, permitting a cost-effective production of the wiper arm in a unit with the quick connecting device. Furthermore, the advantage can be afforded that the elastic clamping jaw can be formed integrally with the wiper blade head of the windshield wiper device.

According to yet further embodiments, the elastic clamping jaw can surround the drive shaft and the torque transmission part in the clamping position in which the quick connecting device clamps the wiper arm to the drive shaft. The clamping mechanism and the drive shaft with the torque transmission part are thereby protected against soiling and/or damage.

According to yet further embodiments, the elastic clamping jaw can be formed from a plastics material. This permits a cost-effective manufacturing of the quick connecting device. Furthermore, it is possible to form the clamping jaw in a unit with the wiper blade head as an integral component by injection molding, as a result of which advantages in terms of manufacturing are obtained.

According to yet further embodiments, the clamping jaw can be designed in such a manner that an external force is absorbed in an elastically flexible manner in a direction of action of force which is oriented approximately perpendicular to a drive axis of the drive shaft. In this manner, it is possible to actuate the clamping jaw by lateral pressing perpendicular to the drive axis of the drive unit.

According to yet further embodiments, the quick connecting device can have an oval release mechanism in which a triggering direction in which the engagement part is moved in order to reach the release position is oriented approximately perpendicular to the direction of action of force.

According to yet further embodiments, the quick connecting device can have a release mechanism in the manner of a rocker, in which a triggering direction in which the engagement part is moved in order to reach the release position is oriented approximately antiparallel to the direction of action of force. It may be advantageous in this connection if a distance between an axis in which the external force acts on the clamping jaw in the direction of action of force and an axis of the triggering direction of the engagement part lies within a range of 0.5 cm and 7 cm, in particular within a range of 1 cm to 4 cm, and furthermore in particular at approximately 2.5 cm.

According to a further preferred embodiment, the plurality of connecting elements can be connected to the upper part at a plurality of upper connecting positions and to the lower part at a plurality of lower corresponding connecting positions, wherein, during the movement of the upper part and the lower part relative to each other, the distance between an upper connecting position and a corresponding lower connecting position is substantially constant, in particular is constant with a deviation of ±1 mm. This makes it possible to provide a transmission of force between the upper part and the lower part, making a windshield wiper device which operates according to the fin ray principle possible.

BRIEF DESCRIPTION OF THE DRAWINGS

Exemplary embodiments of the invention are illustrated in the figures and are described in more detail below. In the figures.

DETAILED DESCRIPTION

Unless noted differently, the same reference signs are used below for identical and identically acting elements.

Figure 1:
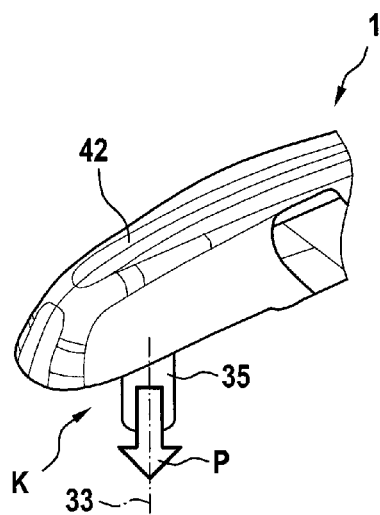
FIG. 1 shows a perspective illustration of a wiper blade head which can be lifted off a drive shaft of a windshield wiper drive unit of the vehicle, with a quick connecting device, according to embodiments of the invention.

FIG. 1 shows a schematic partial illustration of a wiper arm 1 of a windshield wiper device for a vehicle, in particular for a motor vehicle. The perspective illustration of FIG. 1 shows a wiper blade head 42 which can be lifted off a drive shaft 35 of a windshield wiper drive unit of the vehicle and which has a quick connecting device according to embodiments of the invention. The wiper head 42 of the wiper blade is placed onto the drive shaft 35 from above in a direction indicated by an arrow P and is fixed on said drive shaft in a clamping position K. After the fixing in the clamping position K, a torque can be transmitted from the drive shaft 35 about the axis 33 of the drive shaft 35, i.e. about the drive axis 33, to the wiper blade head 42 and to the entire wiper arm 1.

Figure 2:
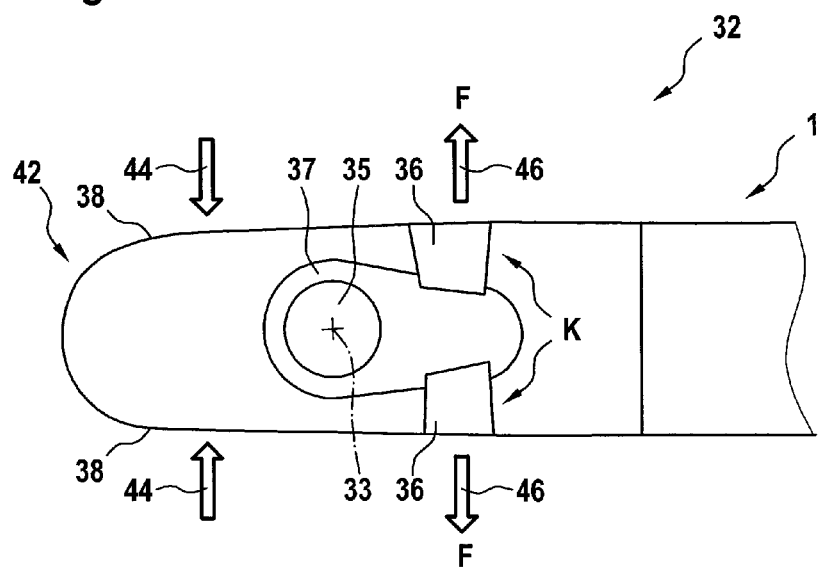
FIG. 2 shows a schematic illustration for explaining the functional principle of the quick connecting device of the rocker type, according to embodiments of the invention.

FIG. 2 shows a schematic illustration for explaining the functional principle of the quick connecting device 32 of the rocker type, according to embodiments of the invention. The windshield wiper device has the quick connecting device 32 which is designed in order to connect the wiper arm 1 releasably to the drive shaft 35 of the drive unit of the vehicle.

FIG. 2 illustrates the wiper blade head 42 with the quick connecting device 32 in a view from below, i.e. as seen from the drive shaft 35 in the direction of the drive axis 33. A torque transmission part 37 is attached to the upper end of the drive shaft 35, away from the drive unit of the windshield wiper device, which torque transmission part serves to transmit the torque, which is applied by the drive unit to the drive shaft 35, to the wiper blade head 42, and also to fasten the wiper blade head 42 securely to the drive shaft 35. The torque transmission part 37 is accommodated here together with the upper end of the drive shaft 35 in the structure of the wiper blade head 42.

Furthermore, the quick connecting device 32 has an elastic clamping jaw 38 which is formed, by way of example, from a plastics material. The clamping jaw 38 is designed in such a manner that it can absorb the external force in an elastically flexible manner in a direction of action of force 44 which is oriented approximately perpendicular to a drive axis 33 of the drive shaft 35. Furthermore, the quick connecting device 32 has at least one engagement part 36 which is designed to engage in the drive shaft 35 and/or in the torque transmission part 37 attached to the drive shaft 35, in order to transmit a torque about the drive axis 33 from the drive shaft 35 to the wiper arm 1 via the quick connecting device 32.

The elastic clamping jaw 38 can now transfer the engagement part 36, when an external force is applied, from a clamping position K (shown in FIG. 2), in which the quick connecting device 32 clamps the wiper arm 1 to the drive shaft 35, into a release position F (not shown in FIG. 2), in which the wiper arm 1 of the windshield wiper device is removable from the drive shaft 35 or from the torque transmission part 37. The clamping jaw 38 shown in FIG. 2 therefore acts as a rocker, i.e. the quick connecting device 32 is based on a release mechanism in the manner of a rocker, wherein a triggering direction 46 in which the engagement part 36 is moved in order to reach the release position F is oriented approximately antiparallel to the direction of action of force 44. As a result, pressing on the clamping jaw 38 in direction 44 causes a deflection at the point 46 and therefore release of the part 37 by the engagement parts 36. In an advantageous manner, a distance between an axis in which the external force acts on the clamping jaw 38 in the direction of action of force 44 and an axis of the triggering direction 46 of the engagement part 36 lies within a range of 0.5 cm and 7 cm, in particular within a range of 1 cm to 4 cm, and furthermore in particular at approximately 2.5 cm.

According to embodiments which may be combined with other embodiments described herein, the quick connecting device 32 can contain a material which is selected from the group which consists of rubber, carbon, POM, PA, TPE, in particular TPE-S, TPE-O, TPE-U, TPE-A, TPE-V and TPE-E, or any combination thereof.

Figure 3:
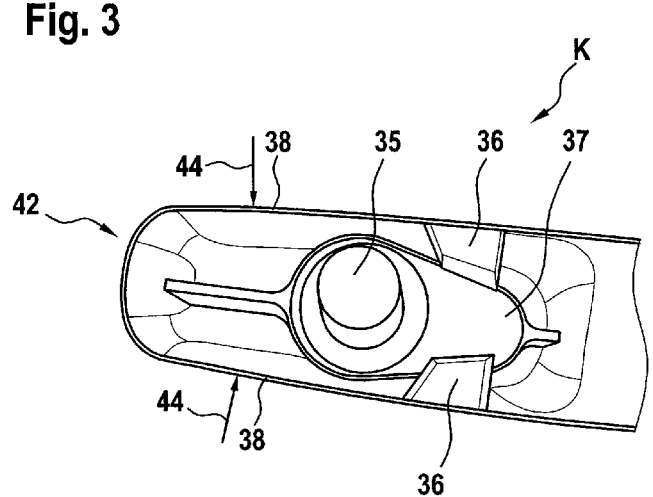
FIG. 3 shows a perspective illustration of the quick connecting device, which is sketched in FIG. 2, of the rocker type in detail, according to embodiments of the invention.

FIG. 3 is a perspective illustration of the quick connecting device, which is sketched in FIG. 2, of the rocker type in detail, according to embodiments of the invention. In the clamping position K shown in FIG. 3, the drive shaft 35 is embedded together with the torque transmission part 37, which is fastened to the drive shaft 35, into the wiper blade head 42. Elastic structures in the wiper blade head 42 form the rocker mechanism with the clamping jaw 38. The two engagement parts 36 keep the torque transmission part 37 here embedded in the wiper blade head 42 as long as an external force, for example by pressing against the point 44, is not in effect.

Figure 4:
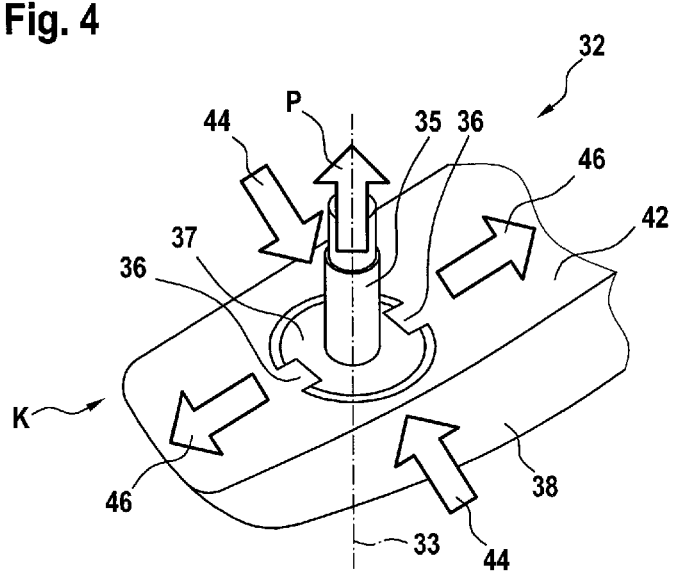
FIG. 4 shows a perspective illustration of a further quick connecting device of the oval type, and also a schematic illustration for explaining the functional principle of the further quick connecting device, according to embodiments of the invention.

FIG. 4 is a perspective illustration of a further quick connecting device of the oval type, and also a schematic illustration for explaining the functional principle of the further quick connecting device, according to embodiments of the invention. The functional principle of the quick connecting device 32 illustrated in FIG. 4 differs from that explained with reference to FIG. 3.

The quick connecting device 32 shown in FIG. 4 is based on an oval release mechanism to the effect that a triggering direction 46 in which an engagement part 36 is moved in order to reach the release position F is oriented approximately perpendicular to the direction of action of force 44. Both the triggering direction 46 and the direction of action of force 44 are oriented perpendicular to the drive axis 33. If, in the case of the quick connecting device 32 with an oval release mechanism, a force is applied in the direction of action of force 44, i.e. pressure is applied to the clamping jaw 38 in the direction of the arrows 44, elastic material of the wiper blade head 42 yields in the triggering direction 46, i.e. an oval deformation of the opening which is approximately circular in the force-free state is brought about. As a result, the laterally arranged engagement parts 36 release the torque transmission part 37 or an undercut in the torque transmission part 37 and the drive shaft 35 can be removed together with the torque transmission part 37 from the wiper blade head 42 in the direction of the arrow P, along the drive axis 33.

In the clamping position K in which the quick connecting device 32 clamps the wiper arm 1 to the drive shaft 35, the elastic clamping jaw 38 together with the wiper blade head 42 surrounds the drive shaft (35) and the torque transmission part 37.

Aspects of an illustrative windshield wiper device for which the embodiments of the windshield wiper device that are described herein, in particular the quick connecting devices which are described herein, are particularly advantageous are described below.

Figure 5A:
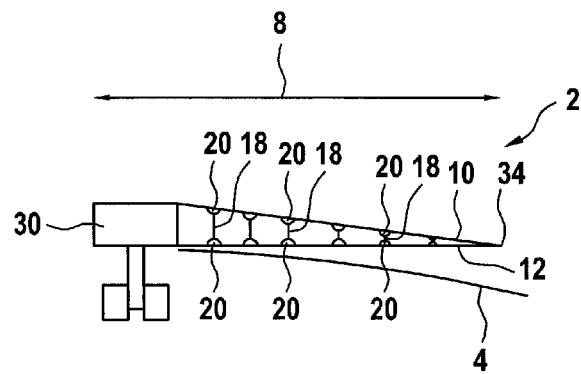
FIG. 5A shows a schematic illustration of a further exemplary embodiment of a windshield wiper device according to the invention in the form of a wiper arm with an integrated wiper blade in a basic position.
Figure 5B:
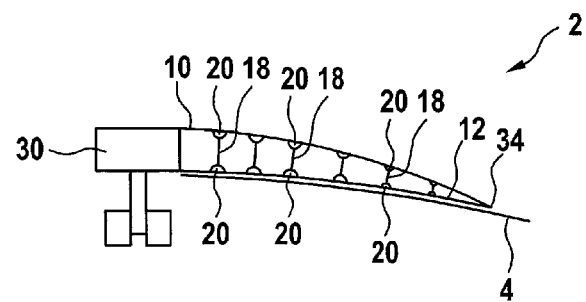
FIG. 5B shows a schematic illustration of the wiper arm with an integrated wiper blade according to FIG. 5A in a position placed against a windshield.

FIGS. 5A and 5B show schematic illustrations of a wiper blade 2 in a basic position and in a position placed against a windshield, according to embodiments of the windshield wiper device of the disclosure. Fin ray wipers for which a quick connecting device 32 according to the embodiments described here is particularly useful are described here. The quick connecting device 32 is not illustrated again in FIGS. 5A, 5B, 6 and 7 and can also be provided in these embodiments, as previously described. The wiper blade 2 serves for wiping a windshield 4 of a vehicle which is, for example, a motor vehicle, in particular a car. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are bendable beams or may be configured as bendable beams. It is likewise possible for only in each case one part of the upper part 10 and/or of the lower part 12 to be configured to be bendable. According to some embodiments that may be combined with the other embodiments described here, a material that has a modulus of elasticity which lies within a range of between 0.005 kN/mm$^2$ and 0.5 kN/mm$^2$, in particular 0.01 kN/mm$^2$ and 0.1 kN/mm$^2$, is used for the upper part 10 and/or the lower part 12. This permits suitable bendability of the upper part 10 and of the lower part 12. Together with a suitably configured cross-sectional area of the upper part 10 and of the lower part 12, optimum flexural rigidity is thus attained.

The upper part 10 and the lower part 12 are fastened to the fastening part 30. The windshield wiper device can be connected to the vehicle by means of the fastening part 30, for example with a quick fix fastening or quick connecting device, or to a windshield wiper drive unit of the vehicle. Such a quick fix fastening can connect the drive shaft 35 of the windshield wiper device to the wiper arm 1 in a rapidly releasable manner. On the side which lies opposite the fastening part 30 along the longitudinal extent of the windshield wiper device, the upper part 10 and the lower part 12 are connected at a connecting position 34. The upper part 10 and the lower part 12 are connected to each other by connecting elements 18. The connecting elements 18 are configured in such a manner that the distance of the connecting position with the upper part 10 and the distance of the connecting position with the lower part 12 changes by at maximum +/−1 mm, in particular by at maximum +/−0.3 mm (for example by thermal expansion and/or tension and compressive loading). The connecting elements 18 can therefore be of substantially inelastic design or the effect of the connecting elements 18 is based on the force transmission thereof between upper part 10 and lower part 12 and not on the elasticity thereof.

The connecting elements 18 are fastened to mutually facing inner longitudinal sides of the upper part 10 and of the lower part 12 by means of rotary joints 20. The rotary joints 20 are typically hinges. In particular, the rotary joints 20 may be in the form of film hinges. This is advantageous especially if the upper part 10, the lower part 12 and/or the connecting elements 18 are produced from a plastics material or are coated with a suitable plastics material.

According to typical embodiments described here, which may be combined with other embodiments described here, a rotary joint is selected from the following group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

The connecting elements are connected to the upper part 10 at a respective upper connecting position and to the lower part 12 at a respective lower connecting position. For example, a rotary joint is provided at each of the connecting positions. During a movement of the upper part 10 and of the lower part 12 relative to each other, the distance of an upper connecting position from a lower connecting position on the same connecting element essentially does not change, i.e. the distance is constant with deviations of, for example, ±1 mm, in particular ±0.3 mm.

Furthermore, the wiper blade 2 has a head end. A fastening part 30, i.e. a wiper-blade-side fastening part 30, is provided at the head end. Along the longitudinal extent of the wiper blade 2, the distance between the upper part 10 and the lower part 12, starting from the head end, becomes smaller, at least in regions of the longitudinal extent of the wiper blade or in a predominant part of the longitudinal extent of the wiper blade. Starting from the head end, the height of the wiper blade tapers in a wedge-shaped manner in regions or becomes smaller in regions of the longitudinal extent. For example, according to embodiments for a plurality of the connecting elements, the length of the connecting elements can be provided in such a manner that the connecting elements provided at the head end are longer than those on the opposite side of the wiper blade along the longitudinal extent.

Embodiments in which the joints are provided by film hinges thus constitute a very simple way of providing the joints for a fin ray wiper. The wiper blade 2 may be provided in one piece, in particular in ready-from-the-mold form. According to typical embodiments, the film hinges exhibit high ductility. This can be provided, for example, by means of a material selected from the group PP, PE, POM and PA. Alternatively, the film hinges may be produced from one or more materials from a group consisting of: TPE (Thermoplastic Elastomer), for example TPE-S, TPE-O, TPE-U, TPE-A, TPE-V and TPE-E.

The connecting elements 18 are spaced apart from one another along the longitudinal extent of the wiper blade 2. The spacings are advantageously less than 50 mm, in particular less than 30 mm. In this way, it is possible to ensure particularly great flexibility of the windshield wiper device, in particular of its lower part, and good adaptation to the curvature and changes in curvature of the windshield to be wiped.

FIG. 5B shows a schematic illustration of the wiper blade 2 according to FIG. 5A in a position placed against the windshield 4. Since the windshield 4 has a curvature, contact pressure forces act on the lower part 12 when the wiper blade 2 is placed against the windshield 4. Since the upper part 10 and the lower part 12 are bendable beams and the connecting elements 18 are mounted rotatably on upper part 10 and lower part 12, the upper part 10 and the lower part 12 are displaceable in relation to each other. By means of the compressive forces acting on the lower part 12 from below, the wiper blade 2 bends in the same direction from which the compressive forces come and is placed precisely against the curvature of the windshield 4.

By means of the construction of the embodiments described here, in the event of an action of force on the lower part (by means of the windshield 4), the lower part bends in the direction from which the force acts. This is provided by the connection of the upper part 10 and of the lower part to the connecting position 34, by the shape and by rotary joints at the connection between the connecting elements and the upper or lower part. A windshield wiper device according to embodiments described here uses the effect of tail fins of certain fish, which tail fins do not yield in the direction of pressure in the event of lateral pressure, but rather arch in the opposite direction, i.e. in the direction from which the pressure comes. This principle is also referred to as the fin ray principle. As a result, a windshield wiper device according to the embodiments described herein has the advantage of improved adaptation to a windshield of a motor vehicle. In the case of a conventional windshield wiper blade, the upper part thereof is customarily rigid, i.e. it is not of bendable design.

Figure 6:
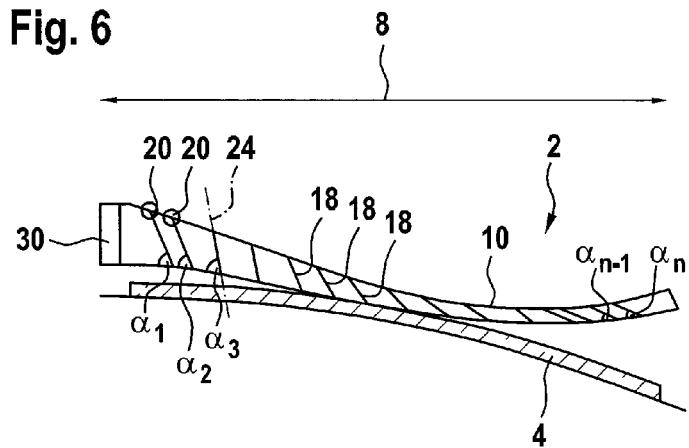
FIG. 6 shows a schematic illustration of a wiper blade according to embodiments of the present invention in a basic position.
Figure 7:
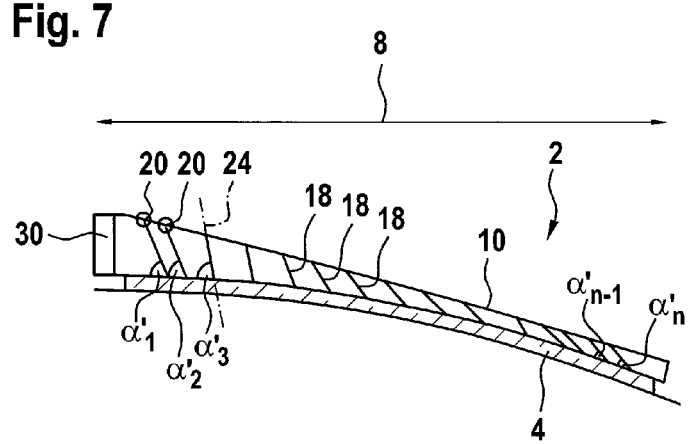
FIG. 7 shows a schematic illustration of a wiper blade according to embodiments of the present invention in a position placed against a windshield.

FIGS. 6 and 7 show schematic illustrations of a wiper blade 2 of a windshield wiper device for a vehicle, in particular for a motor vehicle, in a basic position (FIG. 6), i.e. in an unloaded state, and in a position placed against a windshield 4 (FIG. 7), according to the embodiments described herein. The wiper blade 2 comprises an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along a longitudinal extent 8 of the wiper blade 2. The connecting elements 18 are designed in order to permit a movement of the upper part 10 and of the lower part 12 relative to each other with a movement component along a longitudinal extent 8 of the wiper blade 2. Furthermore, the connecting elements 18 are arranged relative to the lower part 12 in such a manner that, in an unloaded state of the wiper blade 2, an angle $\alpha_n$ of the respective longitudinal axes 24 of the connecting elements 18 relative to the lower part 12 at least partially changes along a longitudinal extent 8 of the wiper blade 2, in particular changes continuously or changes monotonously or strictly monotonously.

In the wiper blade illustrated in FIG. 6 in the unloaded state, the angles $\alpha_n$ of the respective longitudinal axes of the connecting elements 18 relative to the lower part 12, which angles change along the longitudinal extent 8 of the wiper blade 2, are referred to by $\alpha_1, \alpha_2, \alpha_3, \ldots \alpha_{n-1}, \alpha_n$. In a loaded state of the wiper blade, i.e. in a position placed against the windshield, as is illustrated by way of example in FIG. 7, the angles $\alpha_n$ of the respective longitudinal axes 24 of the connecting elements 18 relative to the lower part 12 change in comparison to the unloaded state. In order to convey this, the angles $\alpha_n$ of the respective longitudinal axes of the connecting elements 18 relative to the lower part 12, which angles change along the longitudinal extent 8 of the wiper blade 2, are denoted in the wiper blade which is illustrated in FIG. 2 and which is in a position placed against the windshield by $\alpha'_1, \alpha'_2, \alpha'_3, \ldots \alpha'_{n-1}, \alpha'_n$.

According to embodiments of the windshield wiper device, which can be combined with other embodiments, the wiper blade 2 has at least one first region in which the angle $\alpha_n$ of the longitudinal axes 24 of the connecting elements 18 relative to the lower part 12 decreases along a longitudinal extent 8 of the wiper blade 2 toward a wiper blade end, in particular decreases monotonously, in particular strictly monotonously. Furthermore, the wiper blade 2 can have at least one second region in which the angle $\alpha_n$ of the longitudinal axes 24 of the connecting elements 18 relative to the lower part 12 increases along a longitudinal extent 8 of the wiper blade 2 toward a wiper blade end, in particular increases monotonously, in particular strictly monotonously. According to embodiments as illustrated by way of example in FIGS. 6 and 7, the second region of the wiper blade, in which the angle $\alpha_n$ of the longitudinal axes 24 of the connecting elements 18 relative to the lower part 12 increases along the longitudinal extent 8 of the wiper blade 2 toward a wiper blade end, is arranged at an inner position of the wiper blade that is located in the vicinity of the fastening part 30 of the wiper blade 2. This makes it possible to provide a windshield wiper device which permits particularly good adaptation to the curvature of a windshield. Furthermore, a substantially uniform contact pressure of the windshield wiper device against the windshield and also a homogeneous distribution of force over the windshield wiper device can be provided, and therefore a high wiping quality is provided.

According to embodiments of the wiper blade, which can be combined with other embodiments, the connecting elements 18, in particular in an unloaded state of the wiper blade 2, are fastened to the lower part 12 in such a manner that the longitudinal axes 24 of the connecting elements 18 run at angles $\alpha_n$ with respect to the lower part 12, which angles lie between a lower angle limit value $\alpha_{nu}$ and an upper limit value $\alpha_{no}$. According to embodiments, the lower angle limit value is $\alpha_{nu}=10°$, in particular $\alpha_{nu}=15°$, in particular $\alpha_{nu}=20°$, and the upper angle limit value is $\alpha_{no}=80°$, in particular $\alpha_{no}=90°$, in particular $\alpha_{no}=100°$. This advantageously ensures a particularly good transmission of a force, which acts on the lower part, to the upper part.

According to embodiments of the windshield wiper device, which may be combined with other embodiments, the connecting elements 18 are configured in such a manner that the spacing between the upper part 10 and the lower part 12 at least partially changes along a longitudinal extent 8 of the wiper blade 2, in particular continuously decreases in a first region and continuously increases in a second region. The spacing between the upper part 10 and the lower part 12 along the longitudinal extent 8 of the wiper blade 2 may also include a region in which the spacing between the upper part 10 and the lower part 12 along the longitudinal extent 8 of the wiper blade 2 is substantially constant. The spacing between the upper part 10 and the lower part 12 is greater on the fastening part 30 than at the opposite end at which the connecting position 34 is located.

According to embodiments of the wiper blade, which may be combined with other embodiments, the inner spacing value (facing the fastening part) is at least 15 mm, in particular at least 25 mm, in particular at least 35 mm. According to embodiments which may be combined with other embodiments, the outer spacing value is at least 10 mm, in particular at least 12.5 mm, in particular at least 15 mm. According to embodiments which may be combined with other embodiments, the average spacing value is at least 7.5 mm, in particular at least 9 mm, in particular at least 12.5 mm.

As illustrated by way of example in FIGS. 6 to 7, the connecting elements 18 according to embodiments which may be combined with other embodiments are connected in an articulated manner to the lower part 12 and/or to the upper part 10. In particular, the connecting elements 18 are connected to the lower part 12 and/or to the upper part 10 by means of a first film hinge 20. The first film hinge 20 can be formed integrally with the connecting element 18 and the upper part 10 and/or the lower part 12. The integral configuration of the film hinges permits a simple and cost-effective production.

According to embodiments of the wiper blade, which may be combined with other embodiments described herein, the wiper blade comprises a first region with a first curvature $\omega<0$ and a second region with a second curvature $\omega>0$. Furthermore, the wiper blade according to embodiments may have a third region with a third curvature $\omega<0$, wherein the second region of the wiper blade is arranged with the second curvature $\omega>0$ between the first region with the first curvature $\omega<0$ and the third region with the third curvature $\omega<0$, as is shown by way of example in FIG. 6. A windshield wiper device can therefore be provided with which a substantially uniform contact pressure against the windshield 4 can be realized. Furthermore, a windshield wiper device can be provided which has improved adaptation to the windshield 4 and a high wiping quality.

According to further embodiments, in addition to a quick fix fastening closure which is able to be used for fin ray wipers and in which the entire windshield wiper device is removed from a drive axis on the vehicle, a mechanism can be provided in order to lift the wiper blade 2 of a windshield wiper device from the windshield 4 and/or to place said wiper blade thereagainst. This further simplifies the use, for example for manual cleaning of the windshield 2.

What is claimed is:

1. A windshield wiper device for a vehicle, the windshield wiper device comprising:
a wiper arm (1) with a wiper blade (2), the wiper blade including
an elongate upper part (10), which is configured to be at least partially bendable,
an elongate lower part (12), which is configured to be at least partially bendable, and
a plurality of connecting elements (18) for connecting the upper part (10) and the lower part (12), wherein the connecting elements (18) are spaced apart from one another along a longitudinal extent (8) of the wiper blade (2), wherein the connecting elements (18) are configured to permit a movement of the upper part (10) and the lower part (12) relative to each other with a movement component along the longitudinal extent (8) of the wiper blade (2),
wherein the windshield wiper device furthermore has a quick connecting device (32) which is configured to connect the wiper arm (1) releasably to a drive shaft (35) of a drive unit of the vehicle, wherein the quick connecting device (32) includes:
an engagement part (36) which is configured to engage in the drive shaft (35) and/or in a torque transmission part (37) attached to the drive shaft (35), in order to transmit a torque from the drive shaft (35) to the wiper arm (1) via the quick connecting device (32), and
an elastic clamping jaw (38) which is configured to transfer the engagement part (36), when an external force is applied, from a clamping position (K), in which the quick connecting device (32) clamps the wiper arm (1) to the drive shaft (35), into a release position (F), in which the wiper arm (1) is removable from the drive shaft (35);

wherein the elastic clamping jaw (38) is formed as a single, monolithic unitary piece with a wiper blade head (42) of the wiper arm (1).

2. The windshield wiper device as claimed in claim 1, wherein the quick connecting device (32) includes a fastening part (30) which is configured to connect the upper part (10) and the lower part (12) of the wiper blade (2) to the quick connecting device (32).

3. The windshield wiper device as claimed in claim 1, wherein the quick connecting device (32) contains a material which is selected from the group which consists of rubber, carbon, POM, PA, TPE, or any combination thereof.

4. The windshield wiper device as claimed in claim 1, wherein the elastic clamping jaw (38) is configured to surround the drive shaft (35) and the torque transmission part (37) in the clamping position (K) in which the quick connecting device (32) clamps the wiper arm (1) to the drive shaft (35).

5. The windshield wiper device as claimed in claim 1, wherein the elastic clamping jaw (38) is formed from plastic.

6. The windshield wiper device as claimed in claim 1, wherein the clamping jaw (38) is configured to absorb the external force in an elastically flexible manner in a direction of action of force (44) which is oriented approximately perpendicular to a drive axis (33) of the drive shaft (35).

7. The windshield wiper device as claimed in claim 6, wherein the quick connecting device (32) includes an oval release mechanism in which a triggering direction (46) in which the engagement part (36) is moved in order to reach the release position (F) is oriented approximately perpendicular to the direction of action of force (44).

8. The windshield wiper device as claimed in claim 6, wherein the quick connecting device (32) includes a release mechanism in the manner of a rocker, in which a triggering direction (46) in which the engagement part (36) is moved in order to reach the release position (F) is oriented approximately antiparallel to the direction of action of force (44).

9. The windshield wiper device as claimed in claim 8, wherein a distance between an axis in which the external force acts on the clamping jaw (38) in the direction of action of force (44) and an axis of the triggering direction (46) of the engagement part (36) lies within a range of 0.5 cm and 7 cm.

10. The windshield wiper device as claimed in claim 8, wherein a distance between an axis in which the external force acts on the clamping jaw (38) in the direction of action of force (44) and an axis of the triggering direction (46) of the engagement part (36) lies within a range of 1 cm to 4 cm.

11. The windshield wiper device as claimed in claim 8, wherein a distance between an axis in which the external force acts on the clamping jaw (38) in the direction of action of force (44) and an axis of the triggering direction (46) of the engagement part (36) is approximately 2.5 cm.

12. The windshield wiper device as claimed in claim 1, wherein the plurality of connecting elements are connected to the upper part at a plurality of upper connecting positions and are connected to the lower part at a plurality of lower corresponding connecting positions, and wherein, during the movement of the upper part and the lower part relative to each other, the distance between an upper connecting position and a corresponding lower connecting position is substantially constant.

13. The windshield wiper device as claimed in claim 1, wherein the connecting elements (18) are attached to the upper part (10) and/or to the lower part (12) by means of a rotary joint.

14. The windshield wiper device as claimed in claim 1, wherein the quick connecting device (32) contains a material which is selected from the group which consists of rubber, carbon, POM, PA, TPE-S, TPE-O, TPE-U, TPE-A, TPE-V and TPE-E, or any combination thereof.

15. The windshield wiper device as claimed in claim 1, wherein the plurality of connecting elements are connected to the upper part at a plurality of upper connecting positions and are connected to the lower part at a plurality of lower corresponding connecting positions, and wherein, during the movement of the upper part and the lower part relative to each other, the distance between an upper connecting position and a corresponding lower connecting position is constant with a deviation of ±1 mm.

16. The windshield wiper device as claimed in claim 1, wherein the elastic clamping jaw is an injection molded component together with the wiper blade head.

17. The windshield wiper device as claimed in claim 1, wherein the elastic clamping jaw (38) defines an opening in the wiper blade head sized and shaped to receive the drive shaft and torque transmission part, wherein the opening is surrounded entirely by material of the wiper blade head.

18. A windshield wiper device for a vehicle, the windshield wiper device comprising:

a wiper arm (1) with a wiper blade (2), the wiper blade including
an elongate upper part (10), which is configured to be at least partially bendable,
an elongate lower part (12), which is configured to be at least partially bendable, and
a plurality of connecting elements (18) for connecting the upper part (10) and the lower part (12), wherein the connecting elements (18) are spaced apart from one another along a longitudinal extent (8) of the wiper blade (2), wherein the connecting elements (18) are configured to permit a movement of the upper part (10) and the lower part (12) relative to each other with a movement component along the longitudinal extent (8) of the wiper blade (2),
wherein the windshield wiper device furthermore has a quick connecting device (32) which is configured to connect the wiper arm (1) releasably to a drive shaft (35) of a drive unit of the vehicle, wherein the quick connecting device (32) includes
an engagement part (36) which is configured to engage in the drive shaft (35) and/or in a torque transmission part (37) attached to the drive shaft (35), in order to transmit a torque from the drive shaft (35) to the wiper arm (1) via the quick connecting device (32), and
an elastic clamping jaw (38) which is configured to transfer the engagement part (36), when an external force is applied, from a clamping position (K), in which the quick connecting device (32) clamps the wiper arm (1) to the drive shaft (35), into a release position (F), in which the wiper arm (1) is removable from the drive shaft (35)
wherein the clamping jaw (38) is configured to absorb the external force in an elastically flexible manner in a direction of action of force (44) which is oriented approximately perpendicular to a drive axis (33) of the drive shaft (35)

wherein the quick connecting device (32) includes an oval release mechanism in which a triggering direction (46) in which the engagement part (36) is moved in order to reach the release position (F) is oriented approximately perpendicular to the direction of action of force (44).

19. A windshield wiper device for a vehicle, the windshield wiper device comprising:
a wiper arm (1) with a wiper blade (2), the wiper blade including
an elongate upper part (10), which is configured to be at least partially bendable,
an elongate lower part (12), which is configured to be at least partially bendable, and
a plurality of connecting elements (18) for connecting the upper part (10) and the lower part (12), wherein the connecting elements (18) are spaced apart from one another along a longitudinal extent (8) of the wiper blade (2), wherein the connecting elements (18) are configured to permit a movement of the upper part (10) and the lower part (12) relative to each other with a movement component along the longitudinal extent (8) of the wiper blade (2),
wherein the windshield wiper device furthermore has a quick connecting device (32) which is configured to connect the wiper arm (1) releasably to a drive shaft (35) of a drive unit of the vehicle, wherein the quick connecting device (32) includes
an engagement part (36) which is configured to engage in the drive shaft (35) and/or in a torque transmission part (37) attached to the drive shaft (35), in order to transmit a torque from the drive shaft (35) to the wiper arm (1) via the quick connecting device (32), and
an elastic clamping jaw (38) which is configured to transfer the engagement part (36), when an external force is applied, from a clamping position (K), in which the quick connecting device (32) clamps the wiper arm (1) to the drive shaft (35), into a release position (F), in which the wiper arm (1) is removable from the drive shaft (35)
wherein the clamping jaw (38) is configured to absorb the external force in an elastically flexible manner in a direction of action of force (44) which is oriented approximately perpendicular to a drive axis (33) of the drive shaft (35)
wherein the quick connecting device (32) includes a release mechanism in the manner of a rocker, in which a triggering direction (46) in which the engagement part (36) is moved in order to reach the release position (F) is oriented approximately antiparallel to the direction of action of force (44).

* * * * *